United States Patent
Shin et al.

(10) Patent No.: US 12,314,168 B2
(45) Date of Patent: May 27, 2025

(54) CONTROLLER FOR IMPROVING WEAR LEVELING EFFICIENCY, STORAGE DEVICE AND METHOD FOR OPERATING STORAGE DEVICE

(71) Applicant: SK hynix Inc., Icheon-si (KR)

(72) Inventors: Hee Chan Shin, Icheon-si (KR); Jeong Su Park, Icheon-si (KR); Jong Tack Jung, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 90 days.

(21) Appl. No.: 18/190,031

(22) Filed: Mar. 24, 2023

(65) Prior Publication Data
US 2024/0152452 A1    May 9, 2024

(30) Foreign Application Priority Data

Nov. 7, 2022    (KR) .................. 10-2022-0146950

(51) Int. Cl.
 *G06F 12/02*    (2006.01)
(52) U.S. Cl.
 CPC .. *G06F 12/0246* (2013.01); *G06F 2212/7211* (2013.01)
(58) Field of Classification Search
 CPC ......... G06F 12/0246; G06F 2212/7211; G06F 3/0659; G06F 12/0253; G06F 3/0616; G06F 3/0679; G06F 2212/1016; G06F 2212/1036; G06F 2212/254; G06F 2212/263; G06F 2212/7208; G06F 12/0238; G06F 3/064; G06F 3/0658; G06F 3/0604
 See application file for complete search history.

(56) References Cited

U.S. PATENT DOCUMENTS

| | | |
|---|---|---|
| 10,198,195 B1 | 2/2019 | Fackenthal et al. |
| 2013/0304965 A1* | 11/2013 | Yeh ..................... G06F 12/0246 |
| | | 711/E12.008 |
| 2015/0347038 A1 | 12/2015 | Monteleone et al. |
| 2020/0401513 A1* | 12/2020 | He ..................... G06F 12/0253 |
| 2021/0034512 A1* | 2/2021 | Shin ..................... G06F 3/0683 |
| 2021/0173559 A1* | 6/2021 | Nishikawa ............ G06F 3/0679 |
| 2022/0300184 A1* | 9/2022 | Yang ..................... G06F 3/0616 |
| 2023/0325081 A1* | 10/2023 | Patel ..................... G06F 3/0652 |
| | | 711/166 |

FOREIGN PATENT DOCUMENTS

KR    10-2021-0121696 A    10/2021

* cited by examiner

*Primary Examiner* — Francisco A Grullon

(57) ABSTRACT

Disclosed is a method of adjusting the performance of a wear leveling operation depending on the pattern of a workload according to a command inputted to a storage device, thereby managing a difference in the count of erase operations between storage areas included in a memory not to exceed a limit value and enabling a wear leveling operation to be performed.

18 Claims, 9 Drawing Sheets

CONTROLLER FOR IMPROVING WEAR LEVELING EFFICIENCY, STORAGE DEVICE AND METHOD FOR OPERATING STORAGE DEVICE

CROSS-REFERENCE TO RELATED APPLICATION

The present application claims priority under 35 U.S.C. § 119(a) to Korean Patent Application No. 10-2022-0146950 filed in the Korean Intellectual Property Office on Nov. 7, 2022, which is incorporated herein by reference in its entirety.

BACKGROUND

1. Technical Field

Various embodiments generally relate to a controller for improving wear leveling efficiency, a storage device and a method for operating a storage device.

2. Related Art

A memory may include a plurality of memory cells, and may store data in the plurality of memory cells by a write operation according to a command inputted from the outside. Data stored in the plurality of memory cells may be stored or deleted according to a write operation or an erase operation.

If a write operation and an erase operation on the plurality of memory cells are repeated, then the lifetime of the memory cells may decrease. Due to imbalances in the number of write operations and erase operations on different memory cells, different memory cells may have different operational lifetimes.

Since the overall lifetime of a memory may depend on the lifetime of a memory cell with the highest number of erase operations, the overall lifetime of the memory may decrease accordingly, even if the memory cells have different lifetimes.

SUMMARY

Various embodiments are directed to providing measures for adjusting an operation for improving the lifetime of a memory, depending on the pattern of a workload inputted from the outside, thereby improving the efficiency of the corresponding operation and improving the lifetime of the memory.

In an embodiment, a storage device may include: a memory including a plurality of storage areas; and a controller configured to increase a write count value of a storage area on which a write operation is performed, according to a write command when the write command is inputted from the outside, and to adjust at least one of a performing time point or a performing speed of a wear leveling operation of the memory on the basis of a percentage of storage areas whose write count values are greater than a reference value.

In an embodiment, a method for operating a storage device may include: receiving a write command from an outside; increasing a write count value of a storage area, from among a plurality of storage areas, on which a write operation is performed according to the command; and controlling a wear leveling operation on the plurality of storage areas on the basis of distribution of write count values of the plurality of storage areas.

In an embodiment, a controller may include: a wear leveling condition providing module configured to update write count values of a plurality of storage areas according to a write command inputted from an outside, to classify the plurality of storage areas into a first group and a second group depending on a magnitude of each write count value, and to provide a first average value of write count values of storage areas of the first group and a second average value of write count values of storage areas of the second group; and a wear leveling control module configured to control a wear leveling operation on the plurality of storage areas on the basis of at least one of percentages of the storage areas of the first group and the second group and a difference between the first average value and a second average value.

According to the embodiments of the disclosed technology, it is possible to adjust a time point or a speed for performing a wear leveling operation, in consideration of the pattern of a workload inputted from the outside, thereby enhancing the efficiency of the wear leveling operation and improving the lifetime of the memory.

DETAILED DESCRIPTION

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear. It is to be noticed that the terms "comprising," "having," "including" and so on, used in the description and claims, should not be interpreted as being restricted to the means listed thereafter unless specifically stated otherwise. Where an indefinite or definite article is used when referring to a singular noun, e.g., "a," "an" and "the," this may include a plural of that noun unless specifically stated otherwise.

Also, in describing the components of the disclosure, there may be terms used like first, second, A, B, (a), and (b). These are solely for the purpose of differentiating one component from another component but do not limit the substances, order, sequence or number of the components.

In descriptions for the positional relationships of components, where it is described that at least two components are "connected," "coupled" or "linked," it is to be understood that the at least two components may be directly "connected," "coupled" or "linked" but may be indirectly "connected," "coupled" or "linked" with another component interposed between the two components. Here, another component may be included in at least one of the at least two components which are "connected," "coupled" or "linked" with each other.

In descriptions for time flow relationships of components, an operating method or a fabricating method, in the case where pre and post relationships in terms of time or pre and post relationships in terms of flow are described, for example, by "after," "following," "next" or "before," non-continuous cases may be included unless "immediately" or "directly" is used.

Where a numerical value for a component or its corresponding information (e.g., level, etc.) is mentioned, even though there is no separate explicit description, the numerical value or its corresponding information can be interpreted as including an error range that may be caused by various factors (for example, a process variable, an internal or external shock, noise, etc.).

Hereinafter, various embodiments of the disclosed technology will be described in detail with reference to the accompanying drawings.

Figure 1:
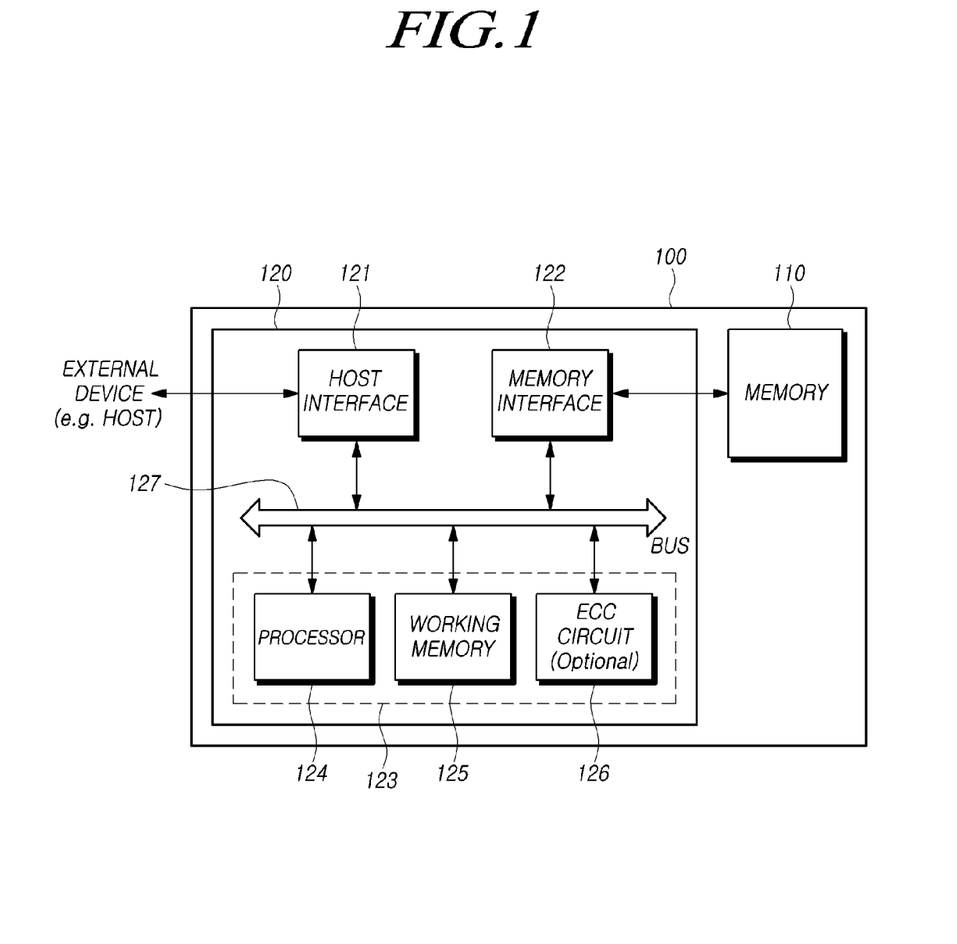
FIG. 1 is a schematic configuration diagram of a storage device according to an embodiment of the disclosure.

FIG. 1 is a schematic configuration diagram of a storage device based on an embodiment of the disclosure.

Referring to FIG. 1, a storage device 100 may include a memory 110 that stores data, and a controller 120 that controls the memory 110.

The memory 110 may include a plurality of memory blocks, and may operate in response to the control of the controller 120. Operations of the memory 110 may include, for example, a read operation, a write operation (also referred to as a "program operation"), and an erase operation.

The memory 110 may include a memory cell array including a plurality of memory cells (simply referred to as "cells") that store data. The memory cell array may exist in a memory block.

For example, the memory 110 may be implemented into various types such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM) and a spin transfer torque random access memory (STT-RAM). The memory 110 may be implemented as a three-dimensional array structure. Embodiments of the disclosed technology may be applied to not only a flash memory in which a charge storage layer is configured by a conductive floating gate, but also to a charge trap flash (CTF) in which a charge storage layer is configured by a dielectric layer.

The memory 110 may receive a command and an address from the controller 120 and may access an area that is selected by the address in the memory cell array. The memory 110 may perform an operation indicated by the command, on the area selected by the address.

For example, the memory 110 may perform a write operation, a read operation and an erase operation. When performing the write operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear-leveling (WL) operation, a read reclaim (RR) operation, a bad block management (BBM) operation, and so forth.

The controller 120 may control the operation of the memory 110 according to a request from a device (e.g., a host) located outside the storage device 100. Also, the controller 120 may control the operation of the memory 110 without a request from the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of driving under human control or autonomous driving, etc.

The host may include at least one operating system. The operating system may generally manage and control the function and operation of the host, and may provide interoperability between the host and the storage device 100. The operating system may be classified into a general operating system and a mobile operating system depending on the mobility of the host.

The controller 120 and the host may be included in devices that are separated from each other. The controller 120 and the host may be implemented by being integrated into one device. For the sake of convenience in explanation, the description below includes an example of the controller 120 and the host as devices that are separated from each other.

For example, the controller 120 may include a memory interface 122 and a control circuit 123, and may further include a host interface 121.

The host interface 121 provides an interface for communication with the host. For example, the host interface 121 provides an interface which uses at least one from among various interface protocols such as a USB (Universal Serial Bus) protocol, an MMC (multimedia card) protocol, a PCI (Peripheral Component Interconnection) protocol, a PCI-E (PCI-express) protocol, an ATA (Advanced Technology Attachment) protocol, a serial-ATA protocol, a parallel-ATA protocol, an SCSI (Small Computer System Interface) protocol, an ESDI (Enhanced Small Disk Interface) protocol, an IDE (Integrated Drive Electronics) protocol, an SMBus (System Management Bus) protocol, an I2C (Inter-Integrated Circuit) protocol, an I3C (Improved Inter-Integrated Circuit) protocol and a private protocol.

The memory interface 122 may be coupled with the memory 110 and may provide an interface for communication with the memory 110. The memory interface 122 may be configured to provide an interface between the memory 110 and the controller 120 in response to the control of the control circuit 123.

When receiving a command from the host, the control circuit 123 may receive the command through the host interface 121, and may perform an operation of processing the received command.

The control circuit 123 performs general control operations of the controller 120 to control the operation of the memory 110. For instance, the control circuit 123 may include at least one of a processor 124 and a working memory 125, and may selectively include an error detection and correction circuit (ECC circuit) 126.

The processor 124 may control the general operation of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate it into the physical block address (PBA) by using a mapping table.

The flash translation layer may use various address mapping methods depending on a mapping unit. Representative address mapping methods include a page mapping method, a block mapping method and a hybrid mapping method.

The processor 124 may randomize data received from the host. For example, the processor 124 may randomize data received from the host, by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 using a derandomizing seed. Derandomized data may be outputted to the host.

The processor 124 may execute firmware to control the operation of the controller 120. In order to control the general operation of the controller 120 and perform a logic calculation, the processor 124 may execute (drive) firmware loaded in the working memory 125 upon booting. An operation of the storage device 100 described below based on an embodiment of the disclosed disclosure may be implemented in such a way that the processor 124 executes firmware in which the corresponding operation is defined.

Firmware, as a program to be executed in the storage device 100 to drive the storage device 100, may include various functional layers. For example, the firmware may include binary data, in which codes for executing the functional layers are respectively defined.

For example, the firmware may include at least one from among a flash translation layer (FTL) that performs a translating function between a logical address requested to the storage device 100 from the host and a physical address of the memory 110, a host interface layer (HIL) that serves to analyze a command requested to the storage device 100 from the host and transfer the command to the flash translation layer (FTL), and a flash interface layer (FIL) that transfers a command, instructed from the flash translation layer (FTL), to the memory 110.

The firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of the defined logic calculation in the working memory 125. The processor 124 may control the controller 120 to generate a command or a signal, according to the result of performing the logic calculation defined in the firmware. When a part of firmware in which a defined logic calculation is not loaded in the working memory 125, the processor 124 may generate an event (e.g., an interrupt) for loading the corresponding part of the firmware into the working memory 125.

The processor 124 may load metadata necessary for driving firmware, from the memory 110. The metadata, such as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data, which are necessary to drive the controller 120. An example of such a working memory 125 includes a volatile memory that may include at least one from among an SRAM (static RAM), a DRAM (dynamic RAM) and an SDRAM (synchronous DRAM).

The error detection and correction circuit 126 may detect an error bit of target data and correct the detected error bit, by using an error correction code. The target data may be, for example, data stored in the working memory 125 or data read from the memory 110.

The error detection and correction circuit 126 may be implemented to decode data by using the error correction code. The error detection and correction circuit 126 may be implemented by various code decoders. For example, a decoder that performs unsystematic code decoding or a decoder that performs systematic code decoding may be used.

For example, the error detection and correction circuit 126 may detect an error bit by the unit of a set sector in each of read data. Each read data may be constituted by a plurality of sectors. The sector may mean a data unit smaller than a page as a read unit of a flash memory. Sectors constituting each read data may be matched with one another through the medium of an address.

The error detection and correction circuit 126 may calculate a bit error rate (BER), and may determine whether an error is correctable or not, in sector units. For example, when a bit error rate (BER) is higher than a set specific value, the error detection and correction circuit 126 may determine that a corresponding sector is uncorrectable or a fail. On the other hand, when a bit error rate (BER) is lower than the set specific value, the error detection and correction circuit 126 may determine that a corresponding sector is correctable or a pass.

The error detection and correction circuit 126 may perform an error detection and correction operation sequentially for all read data. When a sector included in read data is correctable, the error detection and correction circuit 126 may omit an error detection and correction operation for a corresponding sector. When the error detection and correction operation for all read data is completed, the error detection and correction circuit 126 may detect a sector which is determined to be uncorrectable last. There may be one or more sectors that are determined to be uncorrectable. The error detection and correction circuit 126 may transfer information (e.g., address information) about the uncorrectable sector to the processor 124.

A bus 127 may be configured to provide channels among the components 121, 122, 124, 125 and 126 of the controller 120. The bus 127 may include, for example, a control bus for transferring various control signals, commands and the likes, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In some embodiments, in addition to the above-described components 121, 122, 124, 125 and 126 of the controller 120, one or more other components may be added.

The controller 120 may control the general operation of the storage device 100 as described above, and may control a wear leveling operation for improving the lifetime of the memory 110. For example, the wear leveling operation may be periodically performed or may be performed when a preset wear leveling condition is satisfied.

Through the control of the wear leveling operation, the controller 120 may reduce differences in erase operation count among memory cells included in the memory 110, and may improve the overall lifetime of the memory 110.

Figure 2:
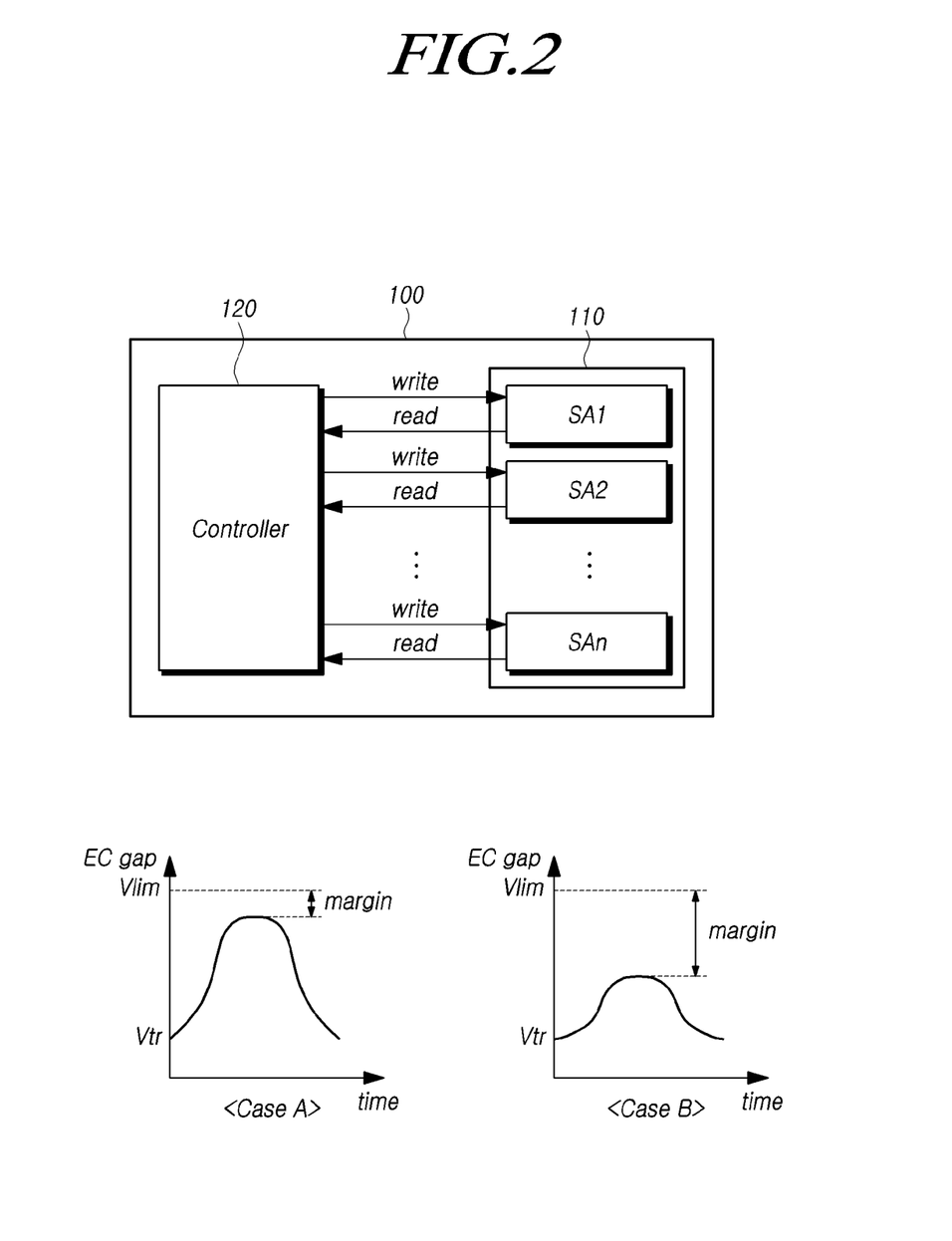
FIG. 2 is a diagram illustrating an example in which the storage device performs a wear leveling operation according to an embodiment of the disclosure.

FIG. 2 is a diagram illustrating an example in which the storage device performs a wear leveling operation according to an embodiment of the disclosure.

Referring to FIG. 2, a memory 110 may include a plurality of storage areas SA1, SA2, . . . , and SAn. Each of the plurality of storage areas SA1, SA2, . . . , and SAn may include a plurality of memory cells. Each of the plurality of storage areas SA1, SA2, . . . , and SAn may include at least one area corresponding to a physical block address.

A write operation or a read operation on memory cells included in a storage area SA may be performed under the control of the controller 120.

The controller 120 may perform a write operation, a read operation or an erase operation on the storage areas SA of the memory 110 according to a command inputted from the outside. the controller 120 may control the operation of the memory 110 according to a command internally generated.

When a write command is inputted from the outside, the controller 120 may check a corresponding storage area SA and perform a write operation on the corresponding storage area SA. Also, the controller 120 may perform an erase operation on a storage area SA according to a command.

The controller 120 may manage a count of the number of write operations or erase operations performed on each of the plurality of storage areas SA1, SA2, . . . , and SAn. The controller 120 may adjust storage areas SA on which a write operation or an erase operation is to be performed, on the basis of differences in the count or number of operations performed on the storage areas SA. The controller 120 may improve the overall lifetime of the memory 110 by adjusting for differences in the count of operations among the storage areas SA.

For example, the controller 120 may manage the number of times an erase operation is performed on each of the plurality of storage areas SA1, SA2, . . . , and SAn. Data on an erase operation count of each of the plurality of storage areas SA1, SA2, . . . , and SAn may be stored in a specific area of the memory 110.

The controller 120 may perform a wear leveling operation that reduces the differences in the count of write operations or erase operations among storage areas SA, for example by comparing a difference in the count of erase operations between at least two of the plurality of storage areas SA1, SA2, . . . , and SAn.

For example, the controller 120 may determine whether to perform a wear leveling operation on the basis of a greatest value among differences in the count of erase operations among the plurality of respective storage areas SA1, SA2, . . . , and SAn. A wear leveling operation may be performed on the basis of a difference, for a storage area SA, in the count of erase operations compared to set values, or may be performed on the basis of a difference in the count of erase operations compared to set values of at least one memory cell included in a storage area SA.

The controller 120 may perform a wear leveling operation when a greatest value from among differences in the count of erase operations is equal to or greater than a preset trigger level value Vtr. When performing a wear leveling operation, the controller 120 may allocate a partial area of the memory 110 as an area to be used for the wear leveling operation.

The controller 120 may check a physical block address, corresponding to a write command and a logical block address inputted from the outside, and may adjust an area on which a write operation or an erase operation is to be performed, to reduce a deviation in the count of operations of a storage area SA from a preset value.

By performing a wear leveling operation, the controller 120 may manage a difference in the count of operations between storage areas SA not to exceed a preset limit value Vlim.

For example, as illustrated in an example of Case A in FIG. 2, when a difference EC gap in the count of erase operations of a storage area SA is equal to or greater than the trigger level value Vtr, a wear leveling operation by the controller 120 may be started. A difference in the count of erase operations of a storage area SA may increase as time elapses, but may gradually decrease without exceeding the limit value Vlim due to the wear leveling operation. A difference in the count of erase operations of a storage area SA may be managed within a predetermined range, and by reducing a deviation in the lifetime of a storage area SA, the overall lifetime of the memory 110 may be improved.

Meanwhile, where a difference in the count of erase operations of a storage area SA is equal to or greater than the trigger level value Vtr, depending on a pattern of a write operation according to a write command inputted from the outside, the speed, at which the difference in the count of erase operations of the storage area SA increases, may decrease or the difference in the count of erase operations of the storage area SA cease to increase.

As illustrated in an example of Case B in FIG. 2, since a difference in the count of erase operations of a storage area SA is equal to or greater than the trigger level value Vtr, a wear leveling operation may be started. Since the pattern of a write operation according to a write command inputted from the outside during a period in which the wear leveling operation is performed may reduce the increase in the difference in the count of erase operations of the storage area SA, the difference in the count of erase operations of the storage area SA may be adjusted to decrease while having a large margin with respect to the limit value Vlim compared to Case A.

Although the difference in the count of erase operations of the storage area SA may be managed not to exceed the limit value Vlim, the efficiency of the wear leveling operation may degrade.

In the embodiment of the disclosed technology, in consideration of the pattern of an operation to be performed on the memory 110 according to a command, by adjusting a performing time point or a performing method of a wear leveling operation to be performed on the memory 110, it is possible to provide measures capable of improving the efficiency of the wear leveling operation and improving the lifetime of the memory 110.

Figure 3:
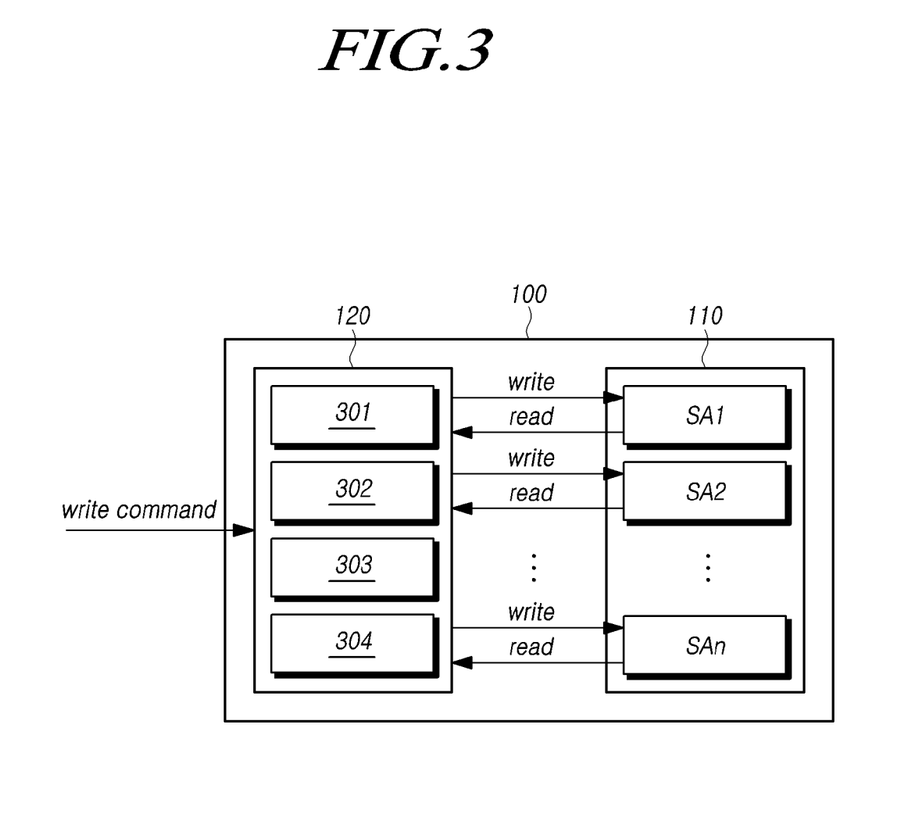
FIG. 3 is a diagram illustrating an example of components that perform a wear leveling operation in a storage device according to an embodiment of the disclosure.
Figure 4:
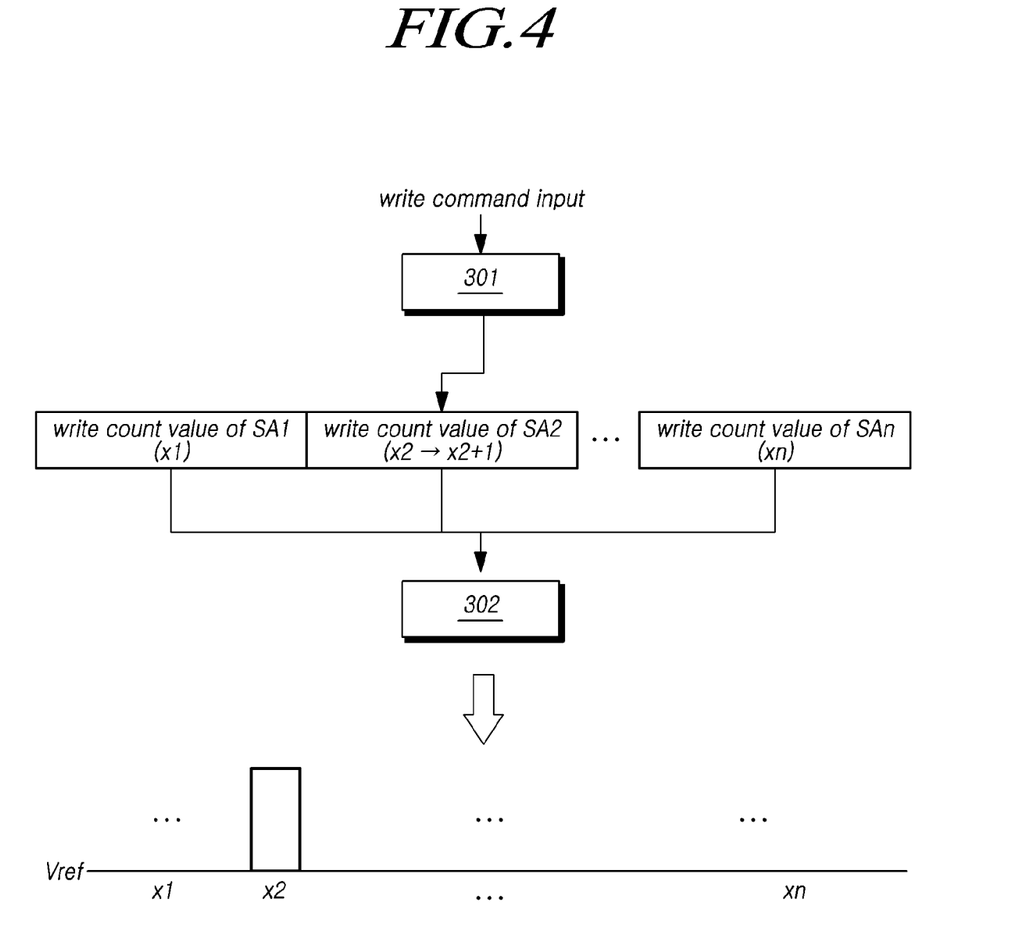
FIG. 4 is a diagram illustrating an example in which a storage device analyzes the pattern of a workload to perform a wear leveling operation according to an embodiment of the disclosure.
Figure 5:
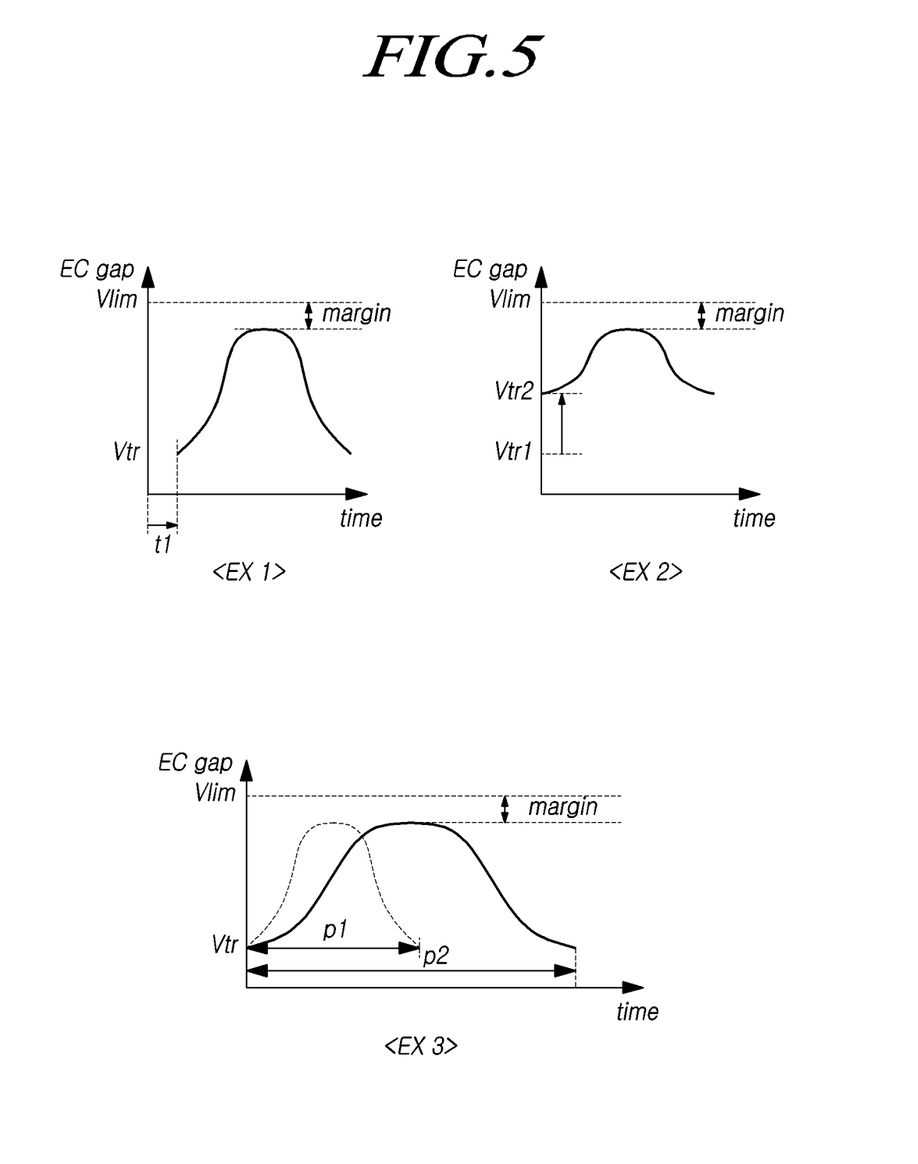
FIG. 5 is a diagram illustrating an example in which storage device performs a wear leveling operation depending on the pattern of a workload according to an embodiment of the disclosure.

FIG. 3 is a diagram illustrating an example of components that perform a wear leveling operation in a storage device according to an embodiment of the disclosure. FIG. 4 is a diagram illustrating an example in which a storage device analyzes the pattern of a workload to perform a wear leveling operation according to an embodiment of the disclosure. FIG. 5 is a diagram illustrating an example in which a storage device performs a wear leveling operation depending on the pattern of a workload according to an embodiment of the disclosure.

Referring to FIG. 3, a controller 120 of a storage device 100 may include a block address calculation module 301, a wear leveling condition providing module 302, a wear leveling control module 303 and a timer 304. At least a part of the above-described components may be implemented in the form of a logic in a control circuit 123 of the controller 120, or may be implemented in the form of an algorithm and be loaded in a processor 124.

When information on a write command and a logical block address is inputted from the outside, the block address calculation module 301 may check a physical block address corresponding to the logical block address where a write operation is to be performed, according to the write command. The block address calculation module 301 may provide information, on a storage area SA including an area indicated by the physical block address where the write operation is to be performed, to the wear leveling condition providing module 302.

The wear leveling condition providing module 302 may increase the write count value of the storage area SA where the write operation is performed. The wear leveling condition providing module 302 may update and manage the write count value of each of the plurality of storage areas SA1, SA2, . . . , and SAn included in a memory 110 of the storage device 100.

The wear leveling condition providing module 302 may provide information on the distribution of the write count values of the plurality of respective storage areas SA1, SA2, . . . , and SAn, to the wear leveling control module 303.

The wear leveling control module 303 may adjust at least a part of performance requirements of a wear leveling operation on the basis of the distribution of the write count values of the plurality of respective storage areas SA1, SA2, . . . , and SAn. For example, the wear leveling control module 303 may adjust at least one of whether to perform a wear leveling operation, a performing time point, a performing period and a performing speed on the basis of the distribution of the write count values of the storage areas SA.

As the wear leveling control module 303 adjusts the performing of a wear leveling operation according to the pattern of an operation (a workload) to be performed on the memory 110 according to a command inputted from the outside, it is possible to improve the efficiency of the wear leveling operation and provide an effect of managing the lifetime of the memory 110 by the wear leveling operation.

Describing, by way of example, the operating method of each component with reference to FIGS. 4 and 5, the block address calculation module 301 may provide information on a storage area SA on which a write operation according to a write command inputted from the outside is to be performed. FIG. 4 illustrates an example where a write command that causes a write operation to be performed on a second storage area SA2, from among n number of storage areas SA1, SA2, . . . , and SAn, is inputted.

The wear leveling condition providing module 302 may update write count values x1, x2, . . . , and xn of the plurality of storage areas SA1, SA2, . . . , and SAn, respectively. The wear leveling condition providing module 302 may provide information on the distribution of write count values, to the wear leveling control module 303.

The wear leveling control module 303 may adjust a method of performing a wear leveling operation, on the basis of the distribution of the write count values of the plurality of respective storage areas SA1, SA2, . . . , and SAn.

For example, the wear leveling control module 303 may adjust a method of performing a wear leveling operation, on the basis of the percentage of storage areas SA whose write count values are greater than a preset reference value Vref among the plurality of storage areas SA1, SA2, . . . , and SAn. The preset reference value Vref may be, for example, '0,' or may be a specific value set in consideration of the driving time of the storage device 100. Alternatively, the reference value Vref may be a value determined on the basis of a value (e.g., a maximum value, a mid value, an average value, a minimum value, etc.) derived according to the distribution of write count values.

In the distribution of write count values provided according to an inputted write command, if the percentage of storage areas SA whose write count values are greater than the preset reference value Vref is less than a threshold value (e.g., 10%), then the pattern of a write operation to be performed according to the corresponding write command may be a pattern that is likely to increase a difference in the count of erase operations of a storage area SA.

The wear leveling control module 303 may cause a wear leveling operation to be performed according to a basic start condition of a wear leveling operation (e.g., whether a difference in the count of erase operations is equal to or greater than the trigger level value Vtr). The wear leveling control module 303 may not change or adjust the basic start condition of a wear leveling operation.

On the other hand, in the distribution of write count values provided according to an inputted write command, if the percentage of storage areas SA whose write count values are greater than the preset reference value Vref is equal to or greater than a threshold value (e.g., 50%), then the pattern of a write operation to be performed according to the corresponding write command may be a pattern that is likely to less increase a difference in the count of erase operations of a storage area SA.

The wear leveling control module 303 may control whether to perform a wear leveling operation, by adjusting at least one of performing conditions such as a performing time point or a performing speed of a wear leveling operation.

For example, referring to an example shown in <EX 1> of FIG. 5, the wear leveling control module 303 may delay a time point at which a wear leveling operation is started, by t1. Since the pattern of a write operation may reduce an increase in a difference in the count of erase operations of a storage area SA, even though a wear leveling operation is performed by being delayed by a predetermined time, the wear leveling operation may be performed such that the difference in the count of erase operations of the storage area SA does not exceed the limit value Vlim. A partial area of the memory 110 may not be used for performing a wear leveling operation, and an area capable of processing a command inputted from the outside may not be reduced, whereby the overall efficiency of the storage device 100 may be improved.

Referring to an example shown in <EX 2> of FIG. 5, the wear leveling control module 303 may adjust the trigger level value Vtr, which serves as a reference for starting a wear leveling operation.

For example, when the percentage of storage areas SA whose write count values are greater than the reference value Vref is equal to or greater than the threshold value, the wear leveling control module 303 may change a set base first trigger level value Vtr1 to a second trigger level value Vtr2. The second trigger level value Vtr2 may be a value greater than the first trigger level value Vtr1. The second trigger level value Vtr2 may be a value that may delay a time point at which a wear leveling operation is performed.

Since the trigger level value Vtr that serves a reference for performing a wear leveling operation is increased, a time point at which the wear leveling operation is performed may be delayed.

Even though a time point at which a wear leveling operation is performed is delayed, since the pattern of a write operation according to a write command is a pattern that increases, less or more slowly, a difference in the count of erase operations of a storage area SA, as in the example shown in <EX 2>, a difference in the count of erase operations of the storage area SA may be managed not to exceed the limit value Vlim by the wear leveling operation. The lifetime of the memory 110 may be managed, and the efficiency of a wear leveling operation may be improved due to delayed performing of the wear leveling operation.

Further, as in an example shown in <EX 3> of FIG. 5, a period in which a wear leveling operation is performed or a speed at which a wear leveling operation is performed may be adjusted.

When the percentage of storage areas SA whose write count values are greater than the reference value Vref is equal to or greater than the threshold value, the wear leveling control module 303 may adjust a period in which a wear leveling operation is performed, from a first period p1 to a second period p2. A speed at which a wear leveling operation is performed may be reduced.

Since a speed at which a wear leveling operation is performed decreases, an area used for the wear leveling operation in the memory 110 may decrease. The wear leveling operation may be performed while minimizing a decrease, due to the wear leveling operation, in an area capable of processing a command inputted from the outside.

A difference in the count of erase operations of a storage area SA due to a wear leveling operation may be managed within the limit value Vlim, and the operating efficiency of the storage device 100 may be improved due to the improvement in the efficiency of a wear leveling operation.

In this way, in embodiments of the disclosed technology, since a method for performing a wear leveling operation is adjusted according to the pattern of a command inputted from the outside, an effect of managing the lifetime of the storage device 100 by a wear leveling operation may be maintained while preventing the efficiency of the storage device 100 from degrading due to an unnecessary wear leveling operation.

In addition, in the embodiment of the disclosed technology, by managing and analyzing the pattern of a workload according to a command inputted from the outside in more various ways, the efficiency of a wear leveling operation according to the pattern of a workload may be improved.

Figure 6:
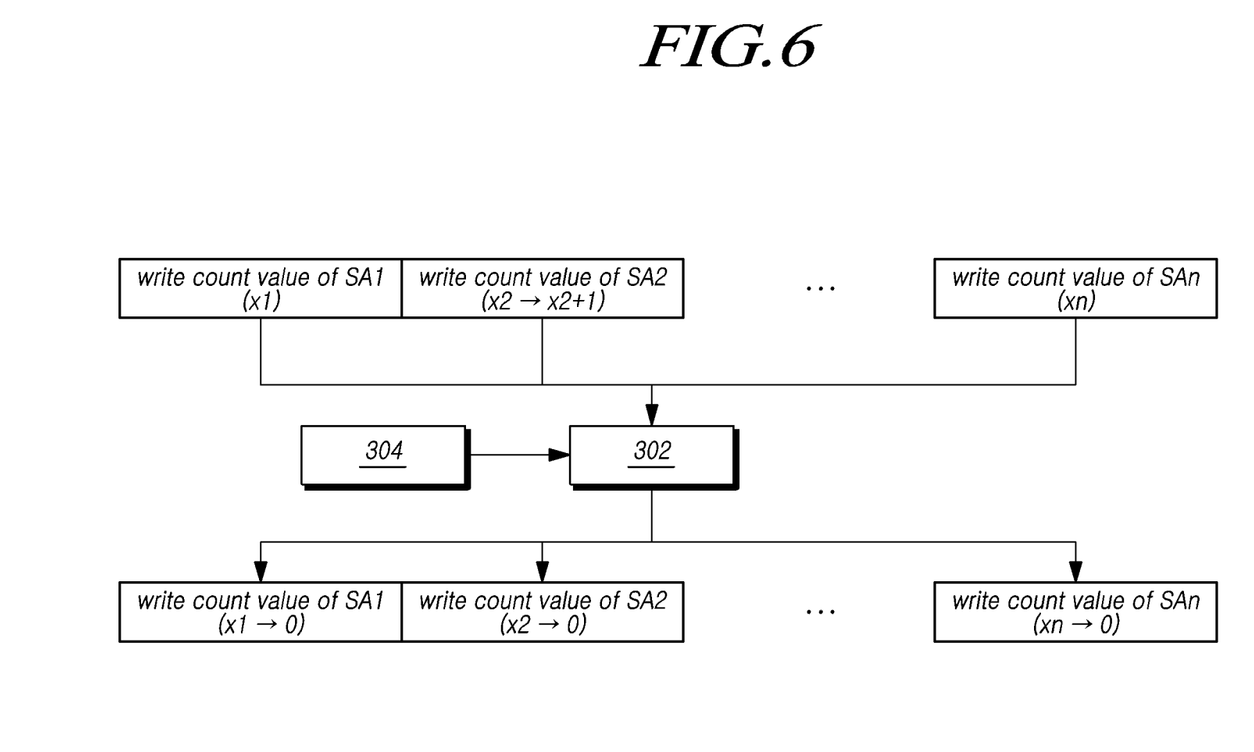
FIGS. 6 to 8 are diagrams illustrating other examples in which a storage device analyzes the pattern of a workload according to an embodiment of the disclosure.
Figure 7:
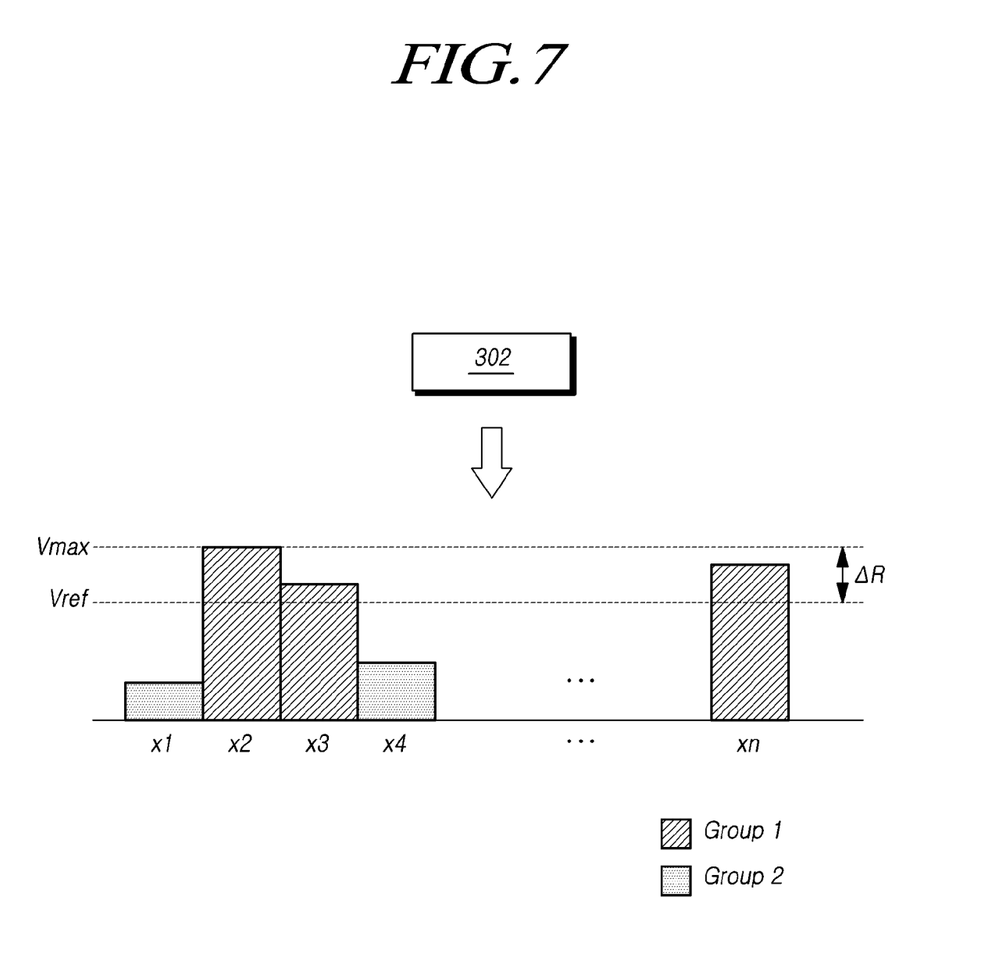
Figure 8:
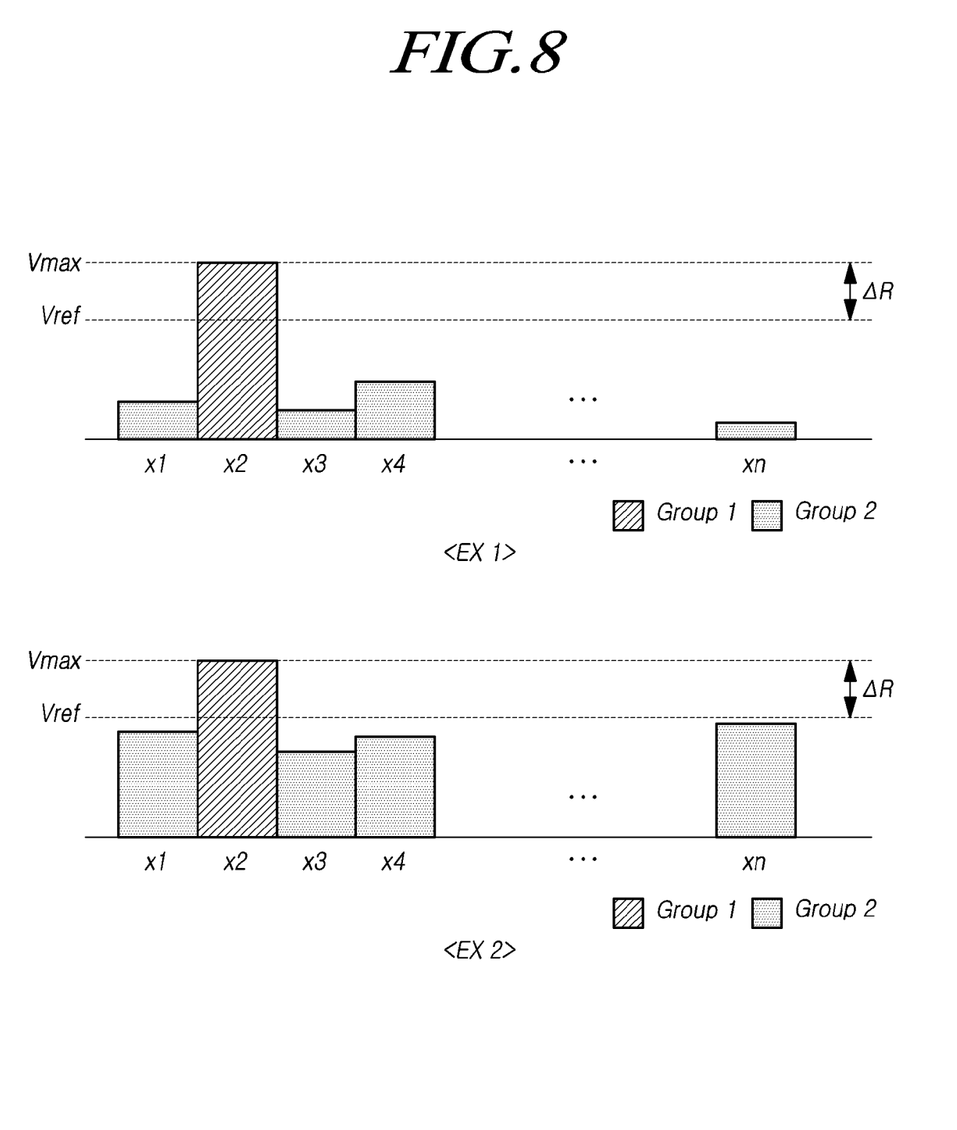

FIGS. 6 to 8 are diagrams illustrating other examples in which a storage device 100 analyzes the pattern of a workload according to an embodiment of the disclosure.

Referring to FIG. 6, a wear leveling condition providing module 302 may increase a write count value of a storage area SA where a write operation is performed according to a write command inputted from the outside. On the basis of the distribution of write count values provided by the wear leveling condition providing module 302, a wear leveling control module 303 may adjust a performing time point or a performing speed of a wear leveling operation.

The wear leveling condition providing module 302 may initialize write count values of storage areas SA on the basis of a timer 304 every preset period.

The wear leveling condition providing module 302 needs to provide the wear leveling control module 303 with information on whether the pattern of a workload according to an inputted write command is a pattern that may exert an influence on whether to start a wear leveling operation.

The wear leveling condition providing module 302 may initialize write count values of respective storage areas SA every predetermined period to provide the wear leveling control module 303 with accurate information on the pattern of a workload according to a write command inputted at a corresponding time point.

Whether to start a wear leveling operation is determined according to whether a difference in the count of erase operations of a storage area SA is equal to or greater than the trigger level value Vtr, and whether to adjust a condition of a wear leveling operation is determined according to the pattern of a workload provided by the wear leveling condition providing module 302. Thus, the wear leveling operation may be performed more efficiently.

The wear leveling condition providing module 302 may group the storage areas SA according to the distribution of write count values of the storage areas SA and provide information on the grouped storage areas SA to the wear leveling control module 303, or may provide values derived from the distribution of write count values of the grouped storage areas SA to the wear leveling control module 303.

For example, referring to FIG. 7, the wear leveling condition providing module 302 may accumulate the write count value of a storage area SA where a write operation is performed according to a write command.

The wear leveling condition providing module 302 may check a storage area SA whose write count value is a maximum value Vmax among the storage areas SA. FIG. 7 exemplarily shows a case where the write count value x2 of the second storage area SA2 is the maximum value Vmax.

The wear leveling condition providing module 302 may classify a storage area SA having a write count value included within a preset range ΔR from the maximum value Vmax of write count values into a first group. A value obtained by subtracting a value corresponding to the preset range ΔR from the maximum value Vmax may be the reference value Vref.

The wear leveling condition providing module 302 may classify the remaining storage areas SA into a second group.

The wear leveling condition providing module 302 may provide information of the first group of storage areas SA and information of the second group of storage areas SA to the wear leveling control module 303.

The wear leveling control module 303 may adjust at least one of a performing time point or a performing speed of a wear leveling operation, on the basis of whether the percentage of storage areas SA included in the first group is equal to or greater than a threshold value.

The reference value Vref may not be used as a fixed value, and may be used as a value variably set according to the maximum value Vmax of write count values of storage areas SA. A method of performing a wear leveling operation may be adjusted on the basis of the distribution of write count values accumulated for a predetermined period of time. An example in which a method of performing a wear leveling operation is adjusted may be any one of the examples described above with reference to FIG. 5.

The wear leveling condition providing module 302 may provide a specific value (e.g., an average value) calculated from write count values of storage areas SA of each group, together with information of the grouped storage areas SA, to the wear leveling control module 303.

The wear leveling control module 303 may determine a method of performing a wear leveling operation, on the basis of the percentage of storage areas SA included in each group and a value derived from write count values of the storage areas SA included in each group.

For example, referring to FIG. 8, the wear leveling condition providing module 302 may classify storage areas SA into a first group and a second group on the basis of the distribution of write count values of the storage areas SA, and may provide information on the first group and the second group to the wear leveling control module 303.

The wear leveling control module 303 may determine whether to adjust a method of performing a wear leveling operation, on the basis of the percentage of storage areas SA included in the first group.

The wear leveling condition providing module 302 may provide a first average value of write count values of the storage areas SA of the first group and a second average value of write count values of the storage areas SA of the second group, to the wear leveling control module 303.

The wear leveling control module 303 may determine whether to adjust a method of performing a wear leveling operation, on the basis of a result of comparing the percentage of storage areas SA included in each group and the average value of the storage areas SA of each group.

For example, as shown in <EX 1> of FIG. 8, the second storage area SA2 may be included in the first group. The percentage of storage areas SA included in the first group may be less than the threshold value. Write count values of storage areas SA included in the second group may be substantially small as shown in the example.

In this case, the difference between the first average value of the write count values of the storage areas SA included in the first group and the second average value of the write count values of the storage areas SA included in the second group may be greater than a preset value.

Since the percentage of storage areas SA greater than the reference value Vref is small and the difference between the first average value of the write count values of the storage areas SA of the first group and the second average value of the write count values of the storage areas SA of the second group is large, the wear leveling control module 303 may not separately adjust a method of performing a wear leveling operation. When a difference in the count of erase operations of a storage area SA is equal to or greater than the trigger level value Vtr, a wear leveling operation may be started.

In another example, as shown in <EX 2> of FIG. 8, the second storage area SA2 may be included in the first group, similar to the example in <EX 1>. The percentage of storage areas SA included in the first group may be small.

Write count values of storage areas SA included in the second group may be relatively large compared to <EX 1>. The difference between the second average value of the write count values of the storage areas SA of the second group and the first average value of the write count values of the storage areas SA of the first group may be less than the preset value.

In this case, the percentage of storage areas SA greater than the reference value Vref may be small, but the deviation between write count values of storage areas SA may not be large.

The wear leveling control module 303 may determine that it is a state in which the necessity of performing a wear leveling operation is low. The wear leveling control module 303 may delay a performing time point of a wear leveling operation or reduce a performing speed of a wear leveling operation.

Since a method of performing a wear leveling operation is variably adjusted depending on the pattern of a workload according to a write command inputted from the outside, effects that the efficiency of the wear leveling operation is improved and the lifetime of the memory 110 is improved according to the wear leveling operation may be provided.

Figure 9:
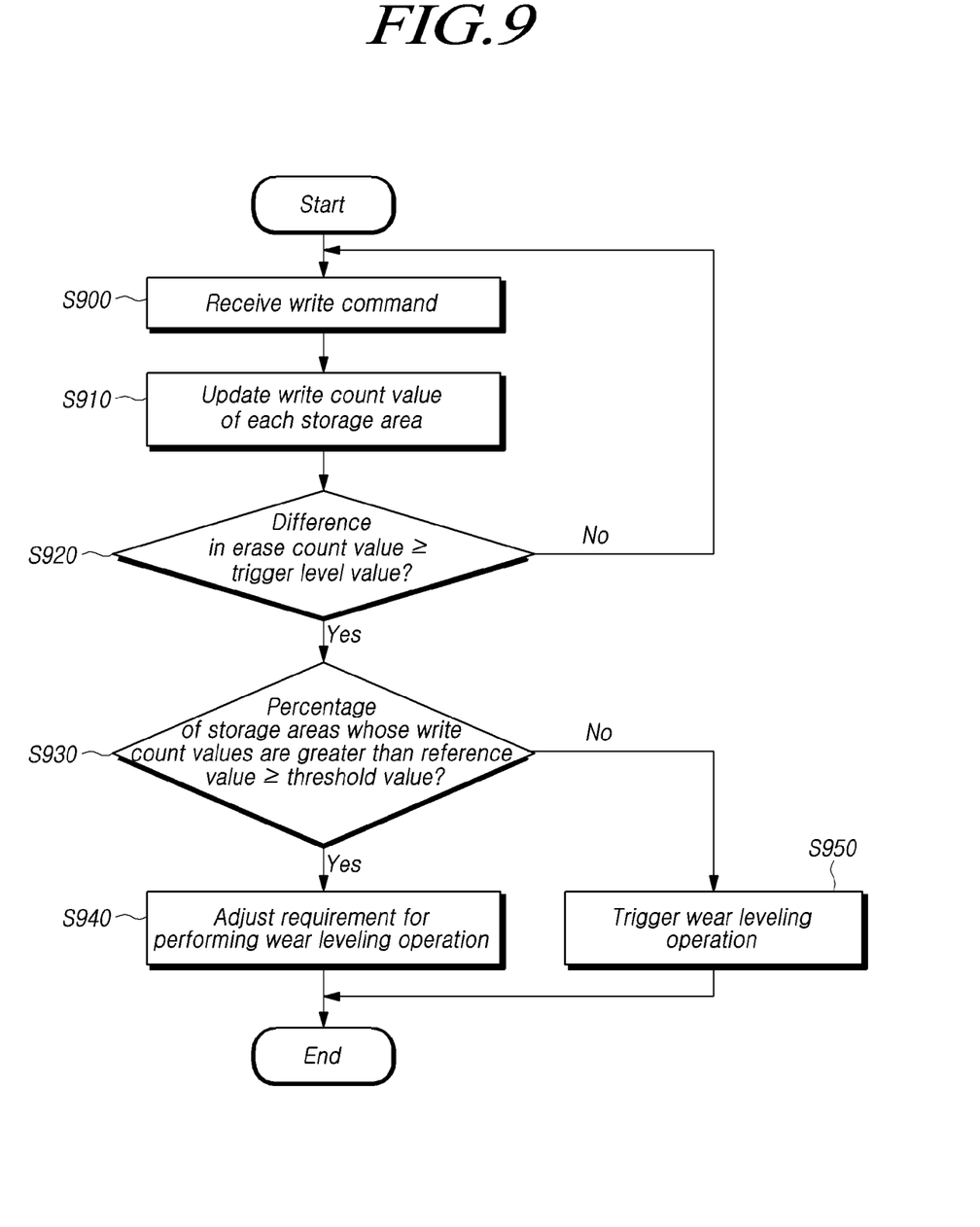
FIG. 9 is a diagram illustrating an example of a method for operating a storage device according to an embodiment of the disclosure.

FIG. 9 is a diagram illustrating an example of a method for operating a storage device according to an embodiment of the disclosure.

Referring to FIG. 9, a controller 120 may receive a write command from the outside (S900).

When the write command is received, the controller 120 may check a storage area SA of a memory 110 where a write operation is to be performed according to the write command. The controller 120 may update the write count value of each storage area SA (S910).

The controller 120 may separately manage information for whether to perform a wear leveling operation in addition to an operation for analyzing the pattern of a workload of a command inputted from the outside. For example, the controller 120 may manage an erase count value according to an erase operation of a storage area SA. The controller 120 may check whether a difference in the count of erase operations of the storage area SA is equal to or greater than the trigger level value Vtr, in order to determine whether to perform a wear leveling operation (S920).

When the difference in the count of erase operations of the storage area SA is less than the trigger level value Vtr, the controller 120 may not perform a wear leveling operation and continuously analyze the pattern of a workload according to a command inputted from the outside.

When the difference in the count of erase operations of the storage area SA is equal to or greater than the trigger level value Vtr, the controller 120 may check the distribution of write count values of storage areas SA.

The controller 120 may check whether the percentage of storage areas SA whose write count values are greater than the reference value Vref is equal to or greater than a threshold value (S930).

When the percentage of storage areas SA whose write count values are greater than the reference value Vref is equal to or greater than the threshold value, the controller 120 may adjust at least a part of requirements for performing a wear leveling operation (S940).

The controller 120 may adjust, for example, one or more of a time point for performing a wear leveling operation, the trigger level value Vtr, a performing period or a performing speed. A wear leveling operation may not be performed, or may be controlled to be performed with low performance. By reducing resources to be used due to performing of a wear leveling operation, the overall efficiency of the storage device 100 may be improved.

When the percentage of storage areas SA whose write count values are greater than the reference value Vref is less than the threshold value, the controller 120 may start a wear leveling operation (S950). An operation capable of improving the efficiency of a wear leveling operation and reducing a deviation in the lifetime of the memory 110 by a wear leveling operation may be continuously performed.

According to embodiments of the disclosed technology, since a condition related with performing a wear leveling operation is adjusted depending on the pattern of a workload according to a command inputted from the outside, the wear leveling operation may be efficiently performed.

A difference in the count of erase operations of a storage area SA of the memory 110 due to a wear leveling operation may be managed not to exceed the limit value Vlim, and the overall operation performance of the storage device 100 may be improved due to the improvement in the efficiency of a wear leveling operation.

The scheme in which an operation to be performed by the controller 120 is controlled depending on the pattern of a workload inputted from the outside may be applied to not only a wear leveling operation but also an operation to be performed periodically or aperiodically by the controller 120 or to be performed under a specific condition.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A storage device comprising:
a memory including a plurality of storage areas; and
a controller configured to increase a write count value of a storage area on which a write operation is performed, according to a write command when the write command is inputted from the outside, and to determine whether performing a wear leveling operation based on ease count values of the plurality of storage areas, and to adjust at least one of a performing time point or a performing speed of the wear leveling operation of the memory on the basis of a percentage of storage areas whose write count values are greater than a reference value,
wherein the reference value is a value obtained by subtracting a preset value from a write count value of a storage area whose write count value is greatest.

2. The storage device according to claim 1, wherein the controller initializes write count values of the plurality of storage areas when preset period is elapsed.

3. The storage device according to claim 1, wherein the controller adjusts at least one of the performing time point or the performing speed of the wear leveling operation of the memory on the basis of a percentage of storage areas whose write count values are greater than 0.

4. The storage device according to claim 1, wherein
the controller designates a storage area that has a write count value included in a preset range from the write count value of the storage area whose write count value is greatest, as a first group, and designates remaining storage areas as a second group, and
the controller adjusts at least one of the performing time point or the performing speed of the wear leveling operation of the memory on the basis of at least one of a percentage of storage areas of the first group or a difference between a first average value of write count values of the storage areas of the first group and a second average value of write count values of the storage areas of the second group.

5. The storage device according to claim 4, wherein the controller performs the wear leveling operation of the memory when the percentage of the storage areas of the first group is less than a threshold value.

6. The storage device according to claim 4, wherein the controller delays the performing time point of the wear leveling operation of the memory or reduces the performing speed of the wear leveling operation of the memory when the percentage of the storage areas of the first group is less than a threshold value and the difference between the first average value and the second average value is within a preset range.

7. The storage device according to claim 1, wherein the controller delays the performing time point of the wear leveling operation of the memory when a percentage of storage areas whose write count values are greater than the reference value is equal to or greater than a threshold value.

8. The storage device according to claim 1, wherein
the controller performs the wear leveling operation of the memory when a difference between the erase count values of at least two of the plurality of storage areas is equal to or greater than a preset trigger level value, and
the controller increases the trigger level value when a percentage of storage areas whose write count values are greater than the reference value is equal to or greater than a threshold value.

9. The storage device according to claim 1, wherein the controller reduces the performing speed of the wear leveling operation of the memory when a percentage of storage areas whose write count values are greater than the reference value is equal to or greater than a threshold value.

10. The storage device according to claim 1, wherein, when the performing speed of the wear leveling operation of the memory is reduced, a size of a storage area to be used for the wear leveling operation among the plurality of storage areas decreases.

11. The storage device according to claim 1, wherein the controller performs the wear leveling operation of the memory when a difference between erase count values of at least two of the plurality of storage areas is equal to or greater than a preset trigger level value and a percentage of storage areas whose write count values are greater than the reference value is less a threshold value.

12. A method for operating a storage device, comprising:
receiving a write command from an outside;
increasing a write count value of a storage area, from among a plurality of storage areas, on which a write operation is performed according to the command;
determining whether performing a wear leveling operation based on erase count values of the plurality of storage areas; and
controlling a performing time point or a performing speed of the wear leveling operation on the plurality of storage areas on the basis of distribution of write count values of the plurality of storage areas, wherein the controlling of the wear leveling operation comprises:

designating a storage area that has a write count value within a preset range from a write count value of a storage area whose write count value is greatest, as a first group;

designating storage areas other than storage areas of the first group among the plurality of storage areas, as a second group; and controlling the wear leveling operation on the basis of a percentage of the storage areas of the first group.

13. The method according to claim 12, wherein the controlling of the wear leveling operation does not perform the wear leveling operation when a difference between erase count values of at least two of the plurality of storage areas is equal to or greater than a preset trigger level value and a percentage of the storage areas of the first group is equal to or greater than a threshold value.

14. The method according to claim 12, wherein the controlling of the wear leveling operation increases a period of performing the wear leveling operation when a difference between erase count values of at least two of the plurality of storage areas is equal to or greater than a preset trigger level value and a percentage of the storage areas of the first group is equal to or greater than a threshold value.

15. The method according to claim 12, wherein the increasing of the write count value comprises:
initializing the write count values of the plurality of storage areas when preset period is elapsed.

16. A controller comprising:

a wear leveling condition providing module configured to update write count values of a plurality of storage areas according to a write command inputted from an outside, to classify the plurality of storage areas into a first group and a second group depending on a magnitude of each write count value, and to provide a first average value of write count values of storage areas of the first group and a second average value of write count values of storage areas of the second group; and a wear leveling control module configured to control a wear leveling operation on the plurality of storage areas on the basis of at least one of percentages of the storage areas of the first group and the second group and a difference between the first average value and a second average value.

17. The controller according to claim 16, wherein the wear leveling control module does not perform the wear leveling operation when the percentage of the storage areas of the first group is equal to or greater than a threshold value.

18. The controller according to claim 16, wherein the wear leveling control module does not perform the wear leveling operation when the percentage of the storage areas of the first group is less than a threshold value and a difference between the first average value and the second average value is within a preset range.

* * * * *